(12) United States Patent
Cassarino

(10) Patent No.: US 9,682,448 B1
(45) Date of Patent: Jun. 20, 2017

(54) APPARATUS FOR TORCH CUTTING LARGE PIPE

(71) Applicant: Vincent P. Cassarino, Toms River, NJ (US)

(72) Inventor: Vincent P. Cassarino, Toms River, NJ (US)

(*) Notice: Subject to any disclaimer, the term of this patent is extended or adjusted under 35 U.S.C. 154(b) by 202 days.

(21) Appl. No.: 14/645,577

(22) Filed: Mar. 12, 2015

(51) Int. Cl.
  B23K 37/02 (2006.01)
  B23K 7/00 (2006.01)

(52) U.S. Cl.
  CPC .......... B23K 37/0217 (2013.01); B23K 7/006 (2013.01); B23K 37/0276 (2013.01)

(58) Field of Classification Search
  CPC .... B23K 7/006; B23K 2201/06; B23K 7/107; B23K 9/0282; B23K 11/04; B23K 2201/04; B23K 7/005; B23K 7/06; B23K 9/127; B23K 9/282; G01N 2291/2675
  USPC .......... 266/56, 55, 62, 67, 54; 219/61, 60 A; 72/125
  See application file for complete search history.

(56) References Cited

U.S. PATENT DOCUMENTS

| | | | | |
|---|---|---|---|---|
| 1,922,529 A | * | 8/1933 | Day ....................... | B23K 7/006 266/56 |
| 7,540,401 B2 | * | 6/2009 | Vermaat ............. | B23K 37/0533 228/212 |
| 2004/0035171 A1 | * | 2/2004 | Gormany ............... | B23K 7/006 72/125 |

* cited by examiner

*Primary Examiner* — Scott Kastler
*Assistant Examiner* — Michael Aboagye
(74) *Attorney, Agent, or Firm* — Michael R. Philips

(57) ABSTRACT

An apparatus for torch cutting large pipe with a pair of split discs mounted to the pipe, one of the discs being a split ring gear. A circumferential track is formed in the facing surfaces of each of the discs. A driver mechanism is mounted on a set of rollers that operate in the tracks. The driver mechanism has a pinion to engage the split ring gear teeth so that turning the pinion causes the driver mechanism to move around the pipe. A torch is mounted to the driver mechanism in a position to cut the pipe as the driver mechanism moves around the pipe.

9 Claims, 3 Drawing Sheets

APPARATUS FOR TORCH CUTTING LARGE PIPE

FIELD OF THE INVENTION

The present invention relates to the field of equipment for cutting metals, and more particularly for an apparatus to support and move a metal cutting torch to enable a straight and uniform cut through the metal.

BACKGROUND OF THE INVENTION

Cutting metal, particularly iron and steel, is often done with an oxygen-acetylene torch that melts and cuts the metal into pieces. Cutting with a torch that is readily portable enables metal cutting at locations where other types of metal cutting machinery are unavailable or impractical. A particular metal cutting operation that is well suited to the oxygen-acetylene torch is the cutting of lengths of large diameter pipe. Large diameter pipe, especially in the range of 8 inches through 24 inches in diameter, is used for the conveying of liquids and gases. Construction of pipelines, that is an assembly of multiple lengths of large diameter pipe, involves cutting the length needed from a standard pipe length as purchased from a pipe manufacturer or distributor.

In prior metal cutting practice, the length of pipe needed for a pipeline installation is cut with the torch being held manually by a skilled iron worker. Since the length and diameter of the pipe makes it necessary to allow the pipe to remain stationary, the metal worker must move the torch around the diameter of the pipe. This situation results in the line of cutting to be somewhat irregular, and attempting to make the line of cutting smooth and straight causes the cutting process to be somewhat slow. Pursuant to cutting, the resultant pipe length is typically welded to a fitting. With the current manually controlled cutting process, the weld may contain imperfections. These imperfections are evaluated by x-ray examination and, if serious, may require re-cutting and re-welding. The problems described cause a pipe construction project to be less than optimally efficient and may potentially produce an inferior finished result.

SUMMARY OF THE INVENTION

The invention described below provides an apparatus for torch cutting large pipe that overcomes the drawbacks of the prior known procedures. The invention apparatus includes a pair of split ring gears that are large enough to encircle the pipe being cut. Each split ring gear has a hinge on a first side and a latch on a second side to clamp the ring gear around the pipe. The two ring gears are held parallel to one another by a number of tie rods. A driver mechanism is mounted in opposing tracks formed in facing surfaces of the ring gears, the driver is able to rotate a pinion that engages one or both ring gears. A torch is mounted to a bracket on the driver at a selected angle, the torch positioned for the flame to contact the pipe surface. To cut the pipe, the driver is actuated to travel at a regular rate of speed around the pipe as the torch cuts the pipe.

BRIEF DESCRIPTION OF THE DRAWINGS

The present invention is best understood in conjunction with the accompanying drawing figures in which like elements are identified by similar reference numerals and wherein.

DETAILED DESCRIPTION OF THE PREFERRED EMBODIMENTS

Figure 1:
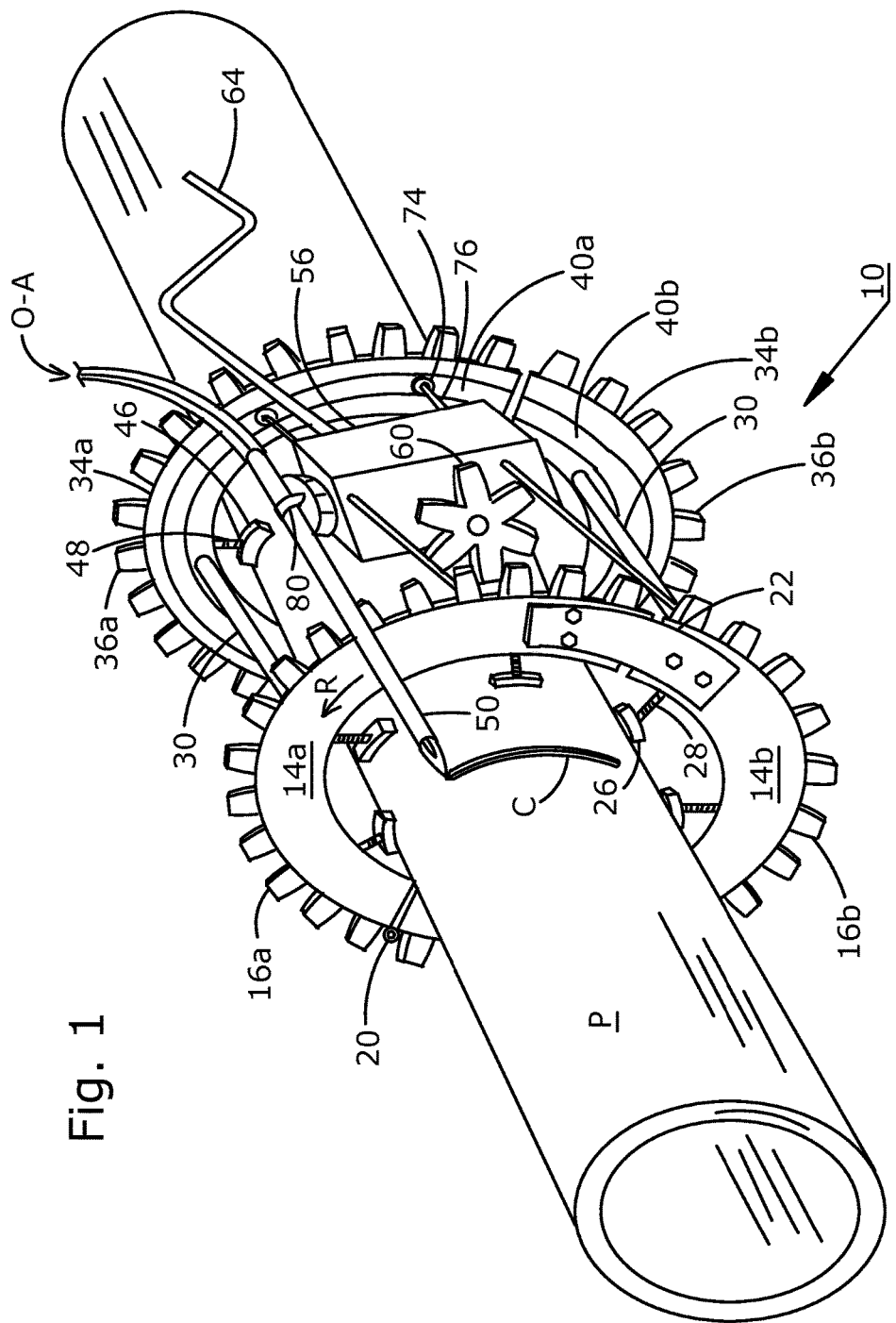
FIG. 1 is a perspective view of the apparatus for torch cutting large pipe mounted on a pipe after the cutting has begun.

Referring to FIG. 1, the apparatus 10 for torch cutting large pipe according to the present invention is illustrated in perspective view as mounted to a large pipe P. Apparatus 10 comprises a first split ring gear 14a, 14b and a second split ring gear 34a, 34b. A hinge 20 pivotably connects the halves of split ring gear 14a, 14b and a second hinge (not visible) pivotably connects the halves of split ring gear 34a, 34b. When assembled in annular configuration, e.g. around a pipe, split ring gear 14a, 14b and split ring gear 34a, 34b each are locked in closed condition by a latch 22 (only one latch visible). Alternate means of holding the halves of split ring gears 14a, 14b and 34a, 34b in annular condition, e.g. a latch at each of the four junctures, is within the scope of the present invention. Split ring gears 14a, 14b and 34a, 34b are of equal inside diameter.

Referring further to FIG. 1, split ring gears 14a, 14b and 34a, 34b each are mounted securely to pipe P with the use of diameter adjusting supports, e.g. a plurality of pads 26 with extension rods 28 extending inwardly from first split ring gear 14a, 14b to accommodate the diameter of pipe P. Pads 26 are formed as a segment of a circle with a diameter substantially equal to the outside diameter of pipe P. This diameter adjusting support device 26, 28 permits a single size apparatus 10 to be used to torch cut multiple sizes of pipe P. A similar diameter adjusting support 46, 48 is seen between split ring gear 34a, 34b and pipe P. According to the preferred embodiment of the invention, each half split ring gear may be fitted with three diameter adjusting supports for optimum stability. Different numbers of diameter adjusting supports may be used according to the intent of the designer. As will be further understood, the diameter adjusting supports are employed only when the outside diameter of pipe P is smaller than the inside diameter of split ring gears 14a, 14b and 34a, 34b. Diameter adjusting supports 26, 28 and 46, 48 may be mounted to the inside diameter of respective split ring gears 14a, 14b and 34a, 34b by any conventional means.

Continuing with FIG. 1, first split ring gear 14a, 14b is preferably connected to, and held in substantially parallel relation with, second split ring gear 34a, 34b by a plurality of tie rods 30. Tie rods 30 are oriented substantially parallel to pipe P. Whereas two tie rods 30 are illustrated, a different number of tie rods 30 may be used.

Referring further to FIG. 1, a pinion 60 is mounted for driving engagement with gear teeth 16a, 16b of first split gear 14a, 14b. Alternately, pinion 60 may be mounted to engage gear teeth 36a, 36b of second split ring gear 34a, 34b. As a further alternative, a pair of oppositely positioned pinions 60 (only one shown) may be mounted to respectively engage split ring gear 14a, 14b and split ring gear 34a, 34b. In a case where a single pinion 60 is used, the split ring gear opposite to pinion 60 may be a split ring disc without gear teeth. Pinion 60 is caused to rotate by driver 56. Depending on the relative sizes of pinion 60 and split ring gear 14a, 14b and the diameter of pipe P, driver 56 may be a single shaft drive device or may contain internal transmission components for a change in speed or power as required. In FIG. 1, driver 56 is shown as being powered by a manually operated crank 64.

The inner surfaces of split ring gears 14a, 14b and 34a, 34b, i.e. the surfaces of each split ring gear facing the opposite split ring gear, are formed with a circumferential track 40a, 40b. Track 40a, 40b form a substantially continuous concentric track ring around the inner surface of split ring gear 34a, 34b. Split ring gear 14a, 14b has a similar track (not visible). A set of rollers 74 are positioned into track 40a, 40b, rollers 74 being supported on a set of rods 76. Whereas two sets of rollers 74 and rods 76 are shown, a greater number of rollers and rods may be used. Rods 76 are securely connected to support driver 56 for movement around the periphery of pipe P when crank 64, or another type of driver, is actuated. An oxygen-acetylene (O-A) torch 50 is mounted to driver 56 by means of a clamp 80, with the flame of torch 50 positioned for cutting pipe P. In operation, driver 56 causes torch 50 to move as indicated by arrow R, with split ring gears 14a, 14b and 34a, 34b remaining fixedly clamped to pipe P, causing torch 50 to generate a smooth cut C through the wall of pipe P. Whereas the present invention is primarily directed to use with an oxygen-acetylene torch, it is to be understood that any torch appropriate to the cutting of metal may be employed.

Figure 2:
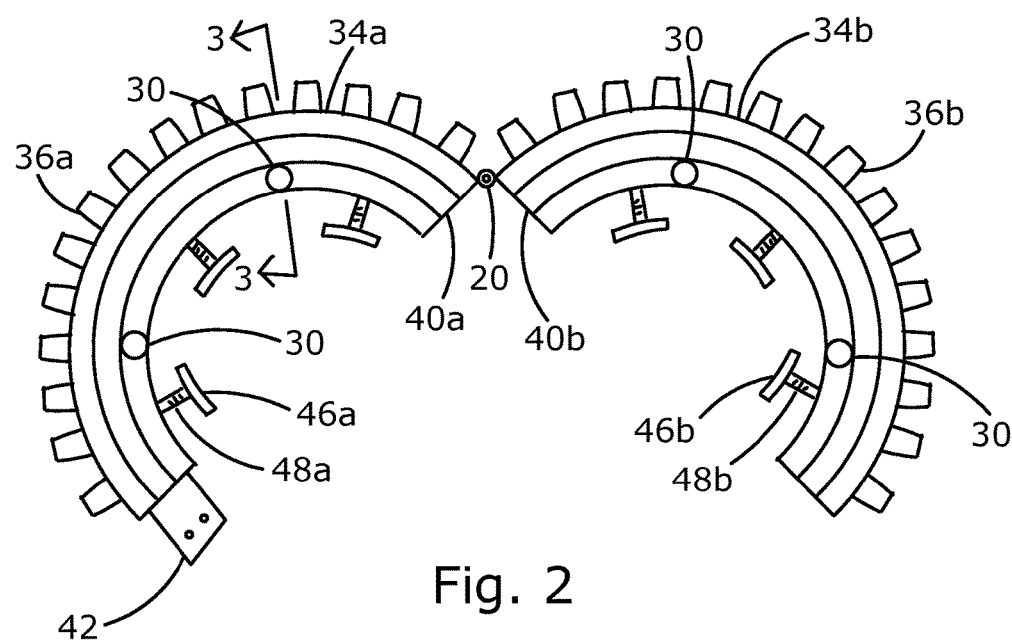
FIG. 2 is an elevation view of a split ring gear of the invention shown in open condition.

Referring now to FIG. 2, split ring gear 34a, 34b is shown in elevation view in open condition. The following description pertains equally to the opposing split ring gear 14a, 14b (see FIG. 1). Each half of split ring gear 34a, 34b is formed with external gear teeth 36a, 36b. When split ring gear 34a, 34b is closed and held together by hinge 20 and latch 42, gear teeth 36a, 36b form a continuous gear pattern. Latch 42 is configured to attach to screw holes formed in the outer surface (not seen) of split ring gear 34a, 34b. In possible alternate embodiments of the invention, the gear teeth may be formed on the planar surface of split ring gear 34a, 34b or directed radially toward the center thereof. A concave track 40a, 40b is formed in the planar surface of split ring gear 34a, 34b. Track 40a, 40b is sized to accommodate rollers 74 (see FIG. 1). A plurality of tie rods 30 are mounted to split ring gear 34a, 34b at a diameter smaller than that of track 40a, 40b. Tie rods 30 connect split ring gear 34a, 34b with opposite split ring gear 14a, 14b (see FIG. 1) to form a rigid assembly capable of being pivoted open and closed as a unit. Pads 46a, 46b and stems 48a, 48b are mounted to the interior surface of split ring gear 34a, 34b to firmly mount to a pipe of smaller diameter. When the outside diameter of the pipe is similar to the inside diameter of split ring gear 34a, 34b without pads 46a, 46b and stems 48a, 48b, no diameter adjusting device is used.

Figure 3:
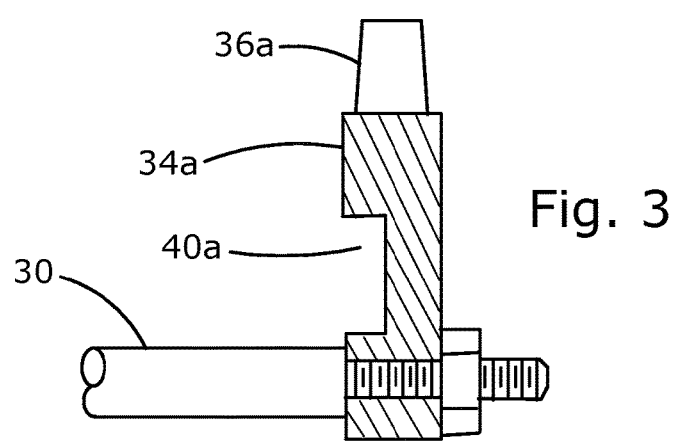
FIG. 3 is a cross sectional view of the split ring gear shown in the direction indicated by line 3-3 of FIG. 2.

Referring now to FIG. 3, a cross section of split ring gear half 34a is shown in the direction indicated by line 3-3 of FIG. 2. Split ring gear half 34a is configured in the shape of a reversed letter "C" with track 40a formed therein. Tie rod 30 is connected to split ring gear 34a at a position closer to the center of split ring gear 34a, tie rod 30 preferably formed with a shoulder for stability. Gear tooth 36a extends radially outwardly of split ring gear 34a.

Figure 4:
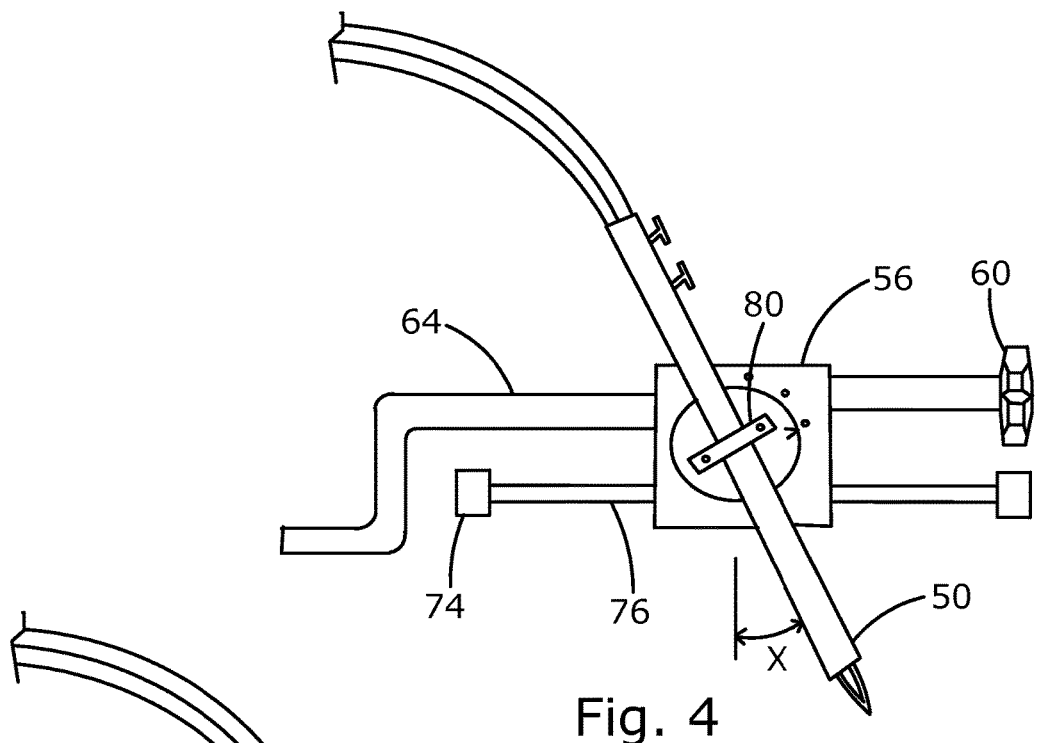
FIG. 4 is an elevation view of a driver mechanism of the present invention with a straight oxygen-acetylene torch mounted thereto, the driver being actuated by a crank.

Referring now to FIG. 4, driver 56 is illustrated in side elevation view with a straight torch 50 mounted thereto. Crank 64 is mounted to driver 56 in a manner to cause pinion 60 to rotate, thereby moving torch 50 around the pipe being cut. As noted, driver 56 may provide a direct connection from crank 64 to pinion 60, or incorporate an internal mechanism according to the speed and power required. Driver 56 and torch 50 are mounted to the pair of split ring gears by two opposed sets of roller 74 and rod 76. Torch 50 is held to driver 56 with clamp 80, clamp 80 being angularly adjustable to position torch 50 at an angle X to vertical. Angle X is preferably between 30° and 45°, most preferably at 37° to vertical.

Figure 5:
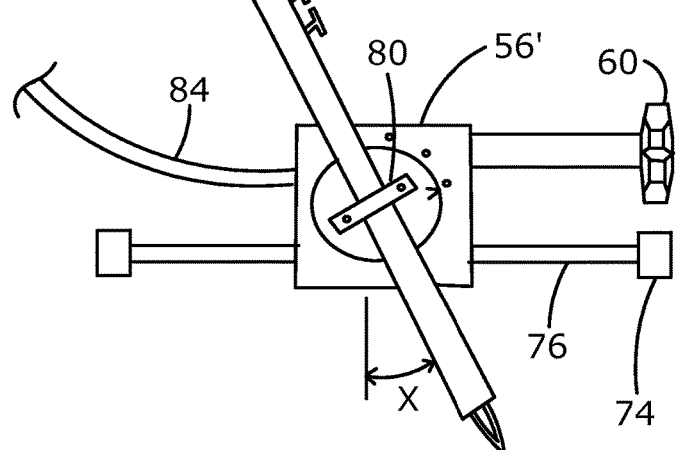
FIG. 5 is an elevation view of a driver mechanism of the present invention with a straight oxygen-acetylene torch mounted thereto, the driver being actuated by a motor.

Referring now to FIG. 5, an alternate driver 56' is illustrated in side elevation view. Driver 56' includes a motor (not seen) mounted internally therein, the motor being energized through power cord 84. The motor is sized to cause pinion 60 to rotate at a substantially steady speed. Other components connected to and supporting driver 56' are similar to those described above.

While the description above discloses preferred embodiments of the present invention, it is contemplated that numerous variations of the invention are possible and are considered to be within the scope of the claims that follow.

What is claimed is:

1. An apparatus for torch cutting large pipe, comprising:
   a. a split ring gear formed with a track in one face thereof, the split ring gear having means for assembling two sides of the split ring clear snugly around a pipe;
   b. a split ring disc formed with a track in one face thereof, the split ring disc having means for assembling two sides of the split ring disc snugly around a pipe;
   c. means for connecting the split ring gear and the split ring disc fixedly in parallel with one another with the tracks facing one another;
   d. a driver mechanism supported on a plurality of rollers that slidingly engage the tracks formed in the split ring gear and split ring disc, the rollers mounted outwardly of the driver mechanism;
   e. a pinion mounted to be rotated by the driver mechanism, the pinion engaged with gear teeth of the split ring gear; and
   f. a torch mounted to the driver mechanism in a position to cut a pipe when the driver mechanism moves the torch around the pipe.

2. The apparatus according to claim 1, further comprising means for adjusting the inside diameter of the split ring gear and the split ring disc to snugly fit an outside diameter of a pipe that is smaller than the inside diameter of the split ring gear and the split ring disc.

3. The apparatus according to claim 2, wherein the means for adjusting the inside diameter of the split ring gear and the split ring disc to snugly fit the outside diameter of a pipe comprises a plurality of stem and pad sets, the stems being mountable to the inside diameter of the split ring gear and the split ring disc.

4. The apparatus according to claim 1, wherein the split ring disc comprises a second split ring gear.

5. The apparatus according to claim 1, wherein the means for assembling the two sides of the split ring gear and the means for assembling the two sides of the split ring disc comprise a first hinge pivotably connecting first ends of the split ring gear and a second hinge pivotably connecting the first ends of the split ring disc and a first latch mounted to connect the second ends of the split ring gear, and a second latch mounted to connect the second ends of the split ring disc.

6. The apparatus according to claim 1, wherein the driver mechanism comprises a manual actuator.

7. The apparatus according to claim 6, wherein the manual actuator comprises a crank.

8. The apparatus according to claim 1, wherein the driver mechanism comprises a motor.

9. The apparatus according to claim 1, further comprising means for adjusting the angle of the torch relative to the pipe.

* * * * *

UNITED STATES PATENT AND TRADEMARK OFFICE
CERTIFICATE OF CORRECTION

PATENT NO. : 9,682,448 B1
APPLICATION NO. : 14/645577
DATED : June 20, 2017
INVENTOR(S) : Vincent P. Cassarino Page 1 of 1

It is certified that error appears in the above-identified patent and that said Letters Patent is hereby corrected as shown below:

Correct Claim 1 as follows:
Claim 1. An apparatus for torch cutting large pipe, comprising:
    a. a split ring gear formed with a track in one face thereof, the split ring gear having means for assembling two sides of the split ring gear snugly around a pipe;
    b. a split ring disc formed with a track in one face thereof, the split ring disc having means for assembling two sides of the split ring disc snugly around a pipe;
    c. means for connecting the split ring gear and the split ring disc fixedly in parallel with one another with the tracks facing one another;
    d. a driver mechanism supported on a plurality of rollers that slidingly engage the tracks formed in the split ring gear and split ring disc, the rollers mounted outwardly of the driver mechanism;
    e. a pinion mounted to be rotated by the driver mechanism, the pinion engaged with gear teeth of the split ring gear; and
    f. a torch mounted to the driver mechanism in a position to cut a pipe when the driver mechanism moves the torch around the pipe.

Signed and Sealed this
Eighth Day of August, 2017

Joseph Matal
*Performing the Functions and Duties of the*
*Under Secretary of Commerce for Intellectual Property and*
*Director of the United States Patent and Trademark Office*